United States Patent [19]
Pope

[11] Patent Number: 6,062,789
[45] Date of Patent: May 16, 2000

[54] NAIL WITH TAPERED FORMED BUSHING

[76] Inventor: Larry D. Pope, 8530 W. 85$^{TH}$ St. South, #85, Tulsa, Okla. 74131

[21] Appl. No.: 09/301,289

[22] Filed: Apr. 28, 1999

Related U.S. Application Data

[60] Provisional application No. 60/100,062, Sep. 12, 1998.

[51] Int. Cl.$^7$ .............................. F16B 15/00; F16B 15/02
[52] U.S. Cl. ........................... 411/482; 411/480; 411/922
[58] Field of Search ................................... 411/480, 482, 411/455, 922

[56] References Cited

U.S. PATENT DOCUMENTS

| | | | |
|---|---|---|---|
| 383,951 | 6/1888 | Hegbon | 411/480 X |
| 4,261,243 | 4/1981 | Palmer | 411/510 |
| 4,932,820 | 6/1990 | Schniedermeier | 411/455 |
| 5,011,354 | 4/1991 | Brownlee | 411/439 |
| 5,492,452 | 2/1996 | Kirsch et al | 411/455 |
| 5,529,451 | 6/1996 | Bruins | 411/482 |
| 5,588,788 | 12/1996 | Dominguez | 411/482 |
| 5,755,545 | 5/1998 | Banks | 411/482 |
| 5,785,478 | 7/1998 | Rotter | 411/487 |

*Primary Examiner*—Neill Wilson
*Attorney, Agent, or Firm*—Molly D. McKay

[57] ABSTRACT

A nail 10 for securing vinyl siding 26 to wall sheathing 28 by inserting a pointed end 20 of the nail 10 through a center of a nail slot 30 provided in an edge of the siding 26. A frusto-conical tapered formed bushing 12 proved on a shaft 14 of the nail 10 adjacent to and spaced apart from a head 16 of the nail 10 so that the nail slot 30 of the siding 26 can be popped into the space between the head 10 and the bushing 12 before the nail 10 is driven fully into a wall sheath 28. A smaller flat face 18 of the bushing 12 facing a pointed end 20 of the shaft 14 and a larger flat face 22 facing the head 16. The larger flat face 22 of the tapered formed bushing 12 being either parallel with or at an acute angle to a lower surface 24 of the head 16.

7 Claims, 2 Drawing Sheets

NAIL WITH TAPERED FORMED BUSHING

DESCRIPTION OF THE RELATED ART

This application claims priority from U.S. Provisional patent application Ser. No. 60/100,062, filed on Sep. 12, 1998.

BACKGROUND OF THE INVENTION

1. Field of the Invention

The present invention relates to a nail for fastening vinyl siding onto a building so that the installer does not have to avoid tightly nailing the siding. When siding is tight nailed to a building, the vinyl is prevented from moving relative to the nails that secure the siding as the vinyl expands and contracts with changes in the temperature, thus leading to buckling, warping or breakage of the siding.

2. Description of the Related Art

The present way in which vinyl siding is secured to building is to use nails and to nail the siding onto the side of the building. Care must be employed in hammering the nails. If the nail is hammered to hard, the vinyl siding can be broken by the impact. Also, even if the vinyl siding does not break immediately, if the nails are too tightly secured against the siding, this will prevent the vinyl from moving relative to the nail as the vinyl contracts and expands due to fluctuations in the outside temperature. If the vinyl siding is unable to move relative to the nail as it expands and contracts, this can lead to the siding buckling on the building or can cause the siding to be broken or to pull away from the nails.

The present invention addresses this problem by providing a nail with a tapered formed bushing provided on the shaft of the nail adjacent to and spaced slightly apart from the head of the nail. This nail captures the vinyl siding between the tapered bushing and the head of the nail when the nail is employed to secure the siding to a building. The nail of the present invention allows the installer to secure vinyl siding to a building so that the vinyl siding can expand and contract on the building. The nail of the present invention also allows the vinyl siding to move relative to the nail, without the installer having to spend a great deal of time and effort in avoiding tight nailing.

SUMMARY OF THE INVENTION

The present invention is a nail with a tapered formed bushing provided on the shaft of the nail adjacent to and spaced apart from a head of the nail. The tapered formed bushing is frusto-conical with its smaller flat face being oriented toward the pointed end of the nail and with its larger flat face being oriented toward the head of the nail. In a first preferred embodiment of the present invention, the larger flat face of the tapered formed bushing is parallel with the lower surface of the head of the nail. In a second embodiment of the present invention, the larger flat face of the tapered formed bushing lies in a plane that forms an acute angle with the lower surface of the head of the nail.

The nail of the present invention is employed to secure vinyl siding to a building. The pointed end of the nail is inserted through the center of a nail slot provided in an edge of the siding and the nail is hammered into the wall sheathing. The wall sheathing may be constructed of plywood, wallboard or other suitable building material. Before the nail is driven tightly against the vinyl siding, the siding is popped or snapped over the tapered formed busing so that the slot of the siding is placed between the lower surface of the head of the nail and the larger flat face of the tapered formed bushing. Then the nail is further hammered until the smaller flat face of the tapered formed bushing encounters the wall sheathing. When the smaller flat face of the tapered formed bushing encounters the wall sheathing, the installer will feel resistance when he attempts to drive the nail further and will stop hammering. In this position, the nail is properly placed to hold the siding, but because the slot is located between the head of the nail and the tapered formed bushing, the vinyl is movably secured to the sheathing by the nail.

In the second embodiment of the present invention, the larger flat face of the tapered formed bushing allows for easier admission of the slot over the tapered formed bushing, thus making it easier to place the siding between the head of the nail and the bushing. This second embodiment also makes it easier to remove the siding from between the head of the nail and the bushing without damage to the siding should it become necessary to remove the siding from the wall.

DETAILED DESCRIPTION OF THE PREFERRED EMBODIMENT

Invention

Figure 1:
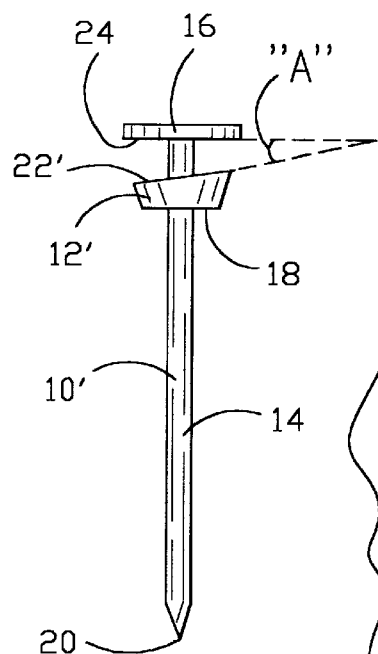
FIG. 1 is a side elevation of one embodiment of a nail with tapered formed bushing constructed in accordance with a preferred embodiment of the present invention.
Figure 2:
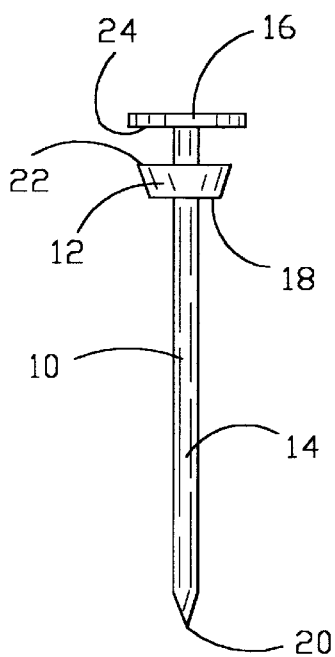
FIG. 2 is a side elevation of another embodiment of a nail with tapered formed bushing constructed in accordance with a preferred embodiment of the present invention.

Referring now to the drawings and initially to FIG. 2, there is illustrated a nail with tapered formed bushing 10 constructed in accordance with a preferred embodiment of the present invention. A tapered formed bushing 12 is proved on a shaft 14 of the nail 10 adjacent to and spaced apart from a head 16 of the nail 10 by approximately ⅛ to ¼ inch. The tapered formed bushing 12 is frusto-conical with a smaller flat face 18 being oriented toward a pointed end 20 of the shaft 14 of the nail 10 and with a larger flat face 22 being oriented toward the head 16 of the nail 10. In a first preferred embodiment of the present invention, the larger flat face 22 of the tapered formed bushing 12 is parallel with a lower surface 24 of the head 16 of the nail 10. In a second embodiment of the present invention, as illustrated in FIG. 1 in association with a first alternate embodiment of the nail 10', an alternate larger flat face 22' of an alternate tapered formed bushing 12' lies in a plane that forms an acute angle "A" with the lower surface 24 of the head 16 of the alternate nail 10'.

Figure 3:
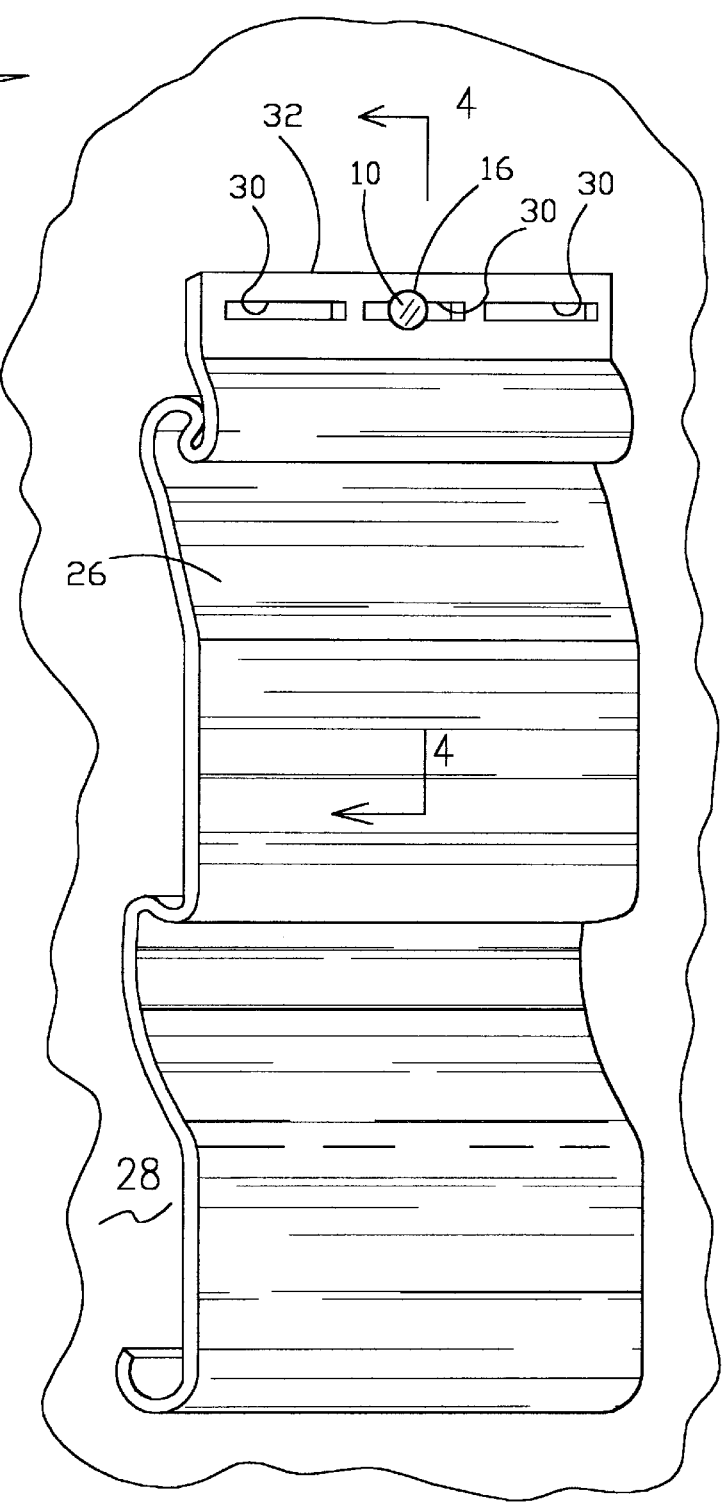
FIG. 3 is a front perspective view of a piece of vinyl siding, shown with the nail with tapered formed bushing of FIG. 2 securing the siding to wall sheathing.
Figure 4:
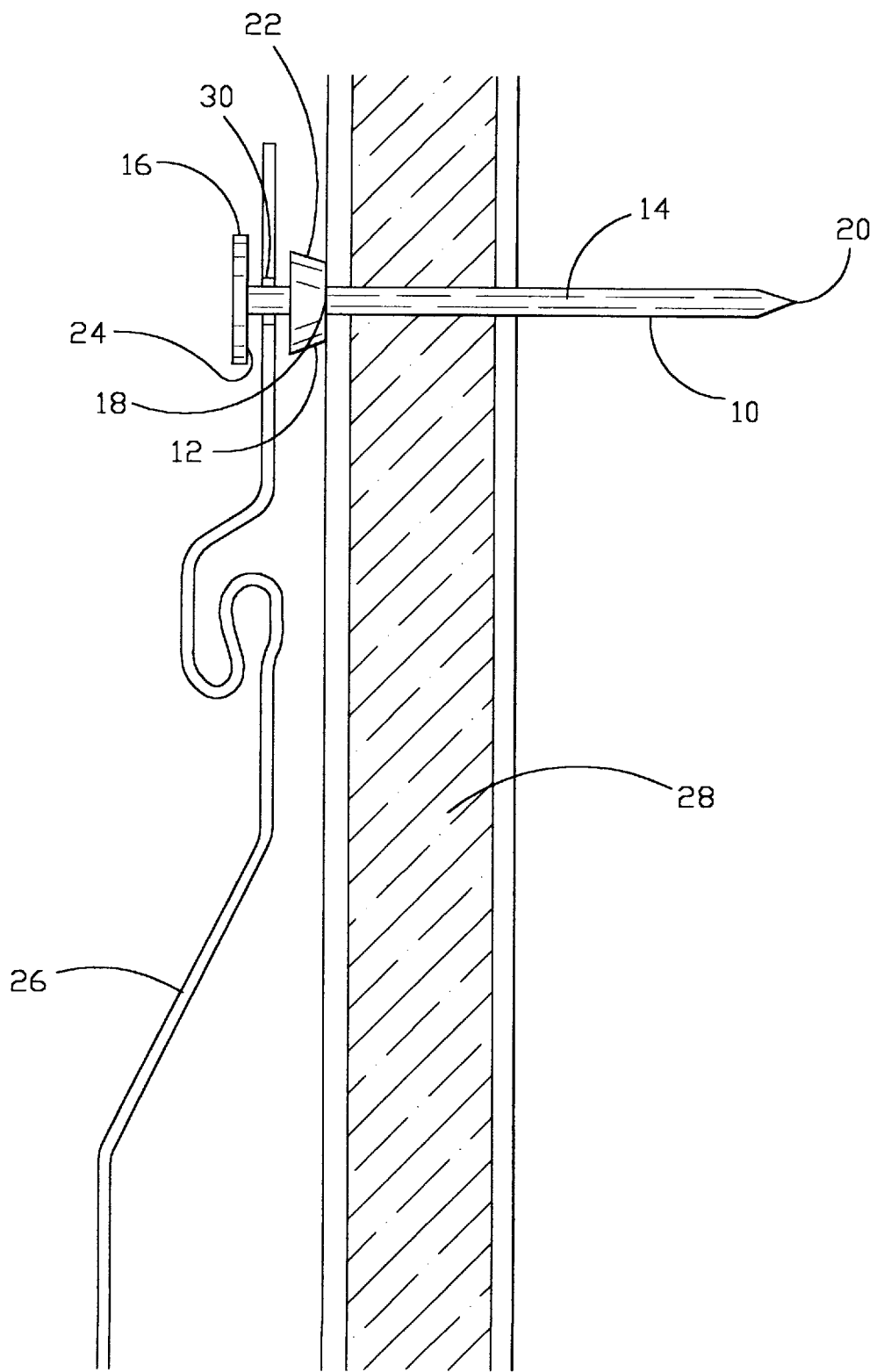
FIG. 4 is a cross sectional view taken along line 4—4 of FIG. 3.

The nail 10, or the alternate nail 10', of the present invention is employed to secure vinyl siding 26 to wall sheathing 28 of a building. As illustrated in FIG. 3, the pointed end 20 of the nail 10 or 10' is inserted through a center of a nail slot 30 provided in an edge 32 of the siding 26 and the nail 10 or 10' is hammered into the wall sheathing 28. But, before the nail 10 or 10' is driven tightly against the vinyl siding 26, the nail slot 30 in the siding 26 is popped or snapped over the tapered formed bushing 12 or 12', as shown in FIG. 4. This places the slot 30 between the lower surface 24 of the head 16 of the nail 10 or 10' and the larger flat face 22 or 22' of the tapered formed bushing 12 or 12'. Then the nail 10 or 10' is further hammered until the smaller flat face 18 of the tapered formed bushing 12 or 12' encounters the wall sheathing 28 as illustrated in FIG. 4.

When the smaller flat face 18 of the tapered formed bushing 12 or 12' encounters the wall sheathing 28, the installer will feel resistance when he attempts to drive the nail 10 or 10' further and this will signal the installer to stop hammering. With the nail 10 or 10' in this position, the nail 10 or 10' is properly placed to hold the siding 26 to the wall sheathing 28. But, because the nail slot 30 is located between the head 16 of the nail 10 or 10' and the tapered formed bushing 12 or 12', the vinyl siding 28 is free to move laterally relative to the nail 10 or 10' within the bounds allowed by the nail slot 30. This is so since the siding 28 is movably secured to the wall sheathing 28 by the nail 10 or 10'.

The larger flat face 22' of the tapered formed bushing 12' of the alternate embodiment nail 10' allows for easier admission of the nail slot 30 over the tapered formed bushing 12', thus making it easier to place the siding 26 between the head 16 of the nail 10' and the bushing 12'. This second embodiment nail 12' also makes it easier to remove the siding 26 from between the head 16 of the nail 12' and the bushing 12' without damage to the siding 26 in the event that it should it become necessary to remove the siding 26 from the wall sheathing 28.

Although the invention has been described for use with vinyl siding 26, its use is not so limited. The nail 10 or 10' may be used in other applications where it is desirable to secure one item to another item without tight nailing the two items together.

While the invention has been described with a certain degree of particularity, it is manifest that many changes may be made in the details of construction and the arrangement of components without departing from the spirit and scope of this disclosure. It is understood that the invention is riot limited to the embodiments set forth herein for the purposes of exemplification, but is to be limited only by the scope of the attached claim or claims, including the full range of equivalency to which each element thereof is entitled.

What is claimed is:

1. A nail with tapered formed bushing for installing vinyl siding to wall sheathing of a building comprising a shaft with a pointed end, a flat nail head provided on an opposite end of the shaft, and a tapered formed bushing provided on the shaft adjacent to and spaced apart from said nail head.

2. A nail with tapered formed bushing according to claim 1 wherein said tapered formed bushing is spaced apart from said nail head a distance of approximately ⅛ to ¼ inch.

3. A nail with tapered formed bushing according to claim 1 wherein said tapered formed bushing is frusto-conical.

4. A nail with tapered formed bushing for installing vinyl siding to wall sheathing of a building comprising a shaft with a pointed end, a nail head provided on an opposite end of the shaft, a tapered formed bushing provided on the shaft adjacent to and spaced apart from said nail head, and a smaller flat face of the bushing extending toward the pointed end of the shaft, and a larger flat face of the bushing extending toward the head of the nail.

5. A nail with tapered formed bushing according to claim 4 wherein said larger flat face of the bushing is approximately parallel with a lower surface of said head of the nail.

6. A nail with tapered formed bushing according to claim 4 wherein said larger flat face of the bushing lies in a plane that makes an acute angle with a lower surface of said head of the nail.

7. A nail with tapered formed bushing according to claim 4 wherein said nail head and said tapered formed bushing are each slightly larger in diameter than said shaft.

\* \* \* \* \*